US011296946B2

(12) United States Patent
Garcia Azorero et al.

(10) Patent No.: US 11,296,946 B2
(45) Date of Patent: Apr. 5, 2022

(54) METHODS AND SERVERS FOR MANAGING TRAFFIC STEERING POLICIES

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Maria Belen Pancorbo Marcos, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/313,932

(22) PCT Filed: Jul. 13, 2016

(86) PCT No.: PCT/EP2016/066615
§ 371 (c)(1),
(2) Date: Dec. 28, 2018

(87) PCT Pub. No.: WO2018/010781
PCT Pub. Date: Jan. 18, 2018

(65) Prior Publication Data
US 2019/0268232 A1  Aug. 29, 2019

(51) Int. Cl.
*H04L 12/24* (2006.01)
*H04L 41/0893* (2022.01)
(Continued)

(52) U.S. Cl.
CPC ...... *H04L 41/0893* (2013.01); *H04L 41/5054* (2013.01); *H04L 45/306* (2013.01);
(Continued)

(58) Field of Classification Search
CPC ............. H04L 41/0893; H04L 41/5054; H04L 45/306; H04L 45/42; H04L 47/125;
(Continued)

(56) References Cited

U.S. PATENT DOCUMENTS 9,258,742 B1    2/2016  Pianigiani et al.
9,853,898 B1 *  12/2017  Subramanian ........ H04L 45/745
(Continued)

OTHER PUBLICATIONS

Li et al., "Dynamic policy and charging control framework", Jun. 2012, Nokia Bell Labs, Bell Labs Technical Journal (vol. 17, Issue: 1, Jun. 2012), pp. 105-123, Total pp. 19 (Year: 2012).*
(Continued)

*Primary Examiner* — Shah M Rahman
(74) *Attorney, Agent, or Firm* — Sage Patent Group

(57) ABSTRACT

Methods, a policy server (110) and a traffic steering server (120) for managing traffic steering policies for steering of traffic of a user equipment are disclosed. The policy server (110) generates (A020) a policy request, wherein the policy request comprises the traffic steering policies, wherein the traffic steering policies include a first traffic steering policy and a second traffic steering policy, both the first and second traffic steering policies being applicable to the traffic in one direction with respect to the user equipment. The policy server (110) sends (A030) the policy request to the traffic steering server (120). The traffic steering server (120) applies (A070) at least one of the first and second traffic steering policies to manage the traffic. Corresponding computer programs and computer program carriers are also disclosed.

8 Claims, 4 Drawing Sheets

(51) Int. Cl.
*H04L 41/5054* (2022.01)
*H04L 47/125* (2022.01)
*H04L 47/20* (2022.01)
*H04L 47/2408* (2022.01)
*H04M 15/00* (2006.01)
*H04W 28/08* (2009.01)
*H04L 45/30* (2022.01)
*H04L 45/42* (2022.01)

(52) U.S. Cl.
CPC ............ *H04L 45/42* (2013.01); *H04L 47/125* (2013.01); *H04L 47/20* (2013.01); *H04L 47/2408* (2013.01); *H04M 15/66* (2013.01); *H04W 28/08* (2013.01)

(58) Field of Classification Search
CPC .... H04L 47/20; H04L 47/2408; H04M 15/66; H04W 28/08
See application file for complete search history.

(56) References Cited

U.S. PATENT DOCUMENTS

| | | | | |
|---|---|---|---|---|
| 10,033,589 | B1* | 7/2018 | Batta | H04L 47/828 |
| 2010/0061272 | A1* | 3/2010 | Veillette | H04L 45/34 |
| | | | | 370/254 |
| 2011/0058479 | A1* | 3/2011 | Chowdhury | H04L 45/04 |
| | | | | 370/237 |
| 2011/0099604 | A1* | 4/2011 | Zhou | H04L 47/70 |
| | | | | 726/1 |
| 2011/0202647 | A1* | 8/2011 | Jin | H04L 41/0806 |
| | | | | 709/223 |
| 2012/0324100 | A1* | 12/2012 | Tomici | H04W 28/0268 |
| | | | | 709/224 |
| 2015/0011182 | A1* | 1/2015 | Goldner | H04M 15/66 |
| | | | | 455/406 |
| 2015/0296531 | A1* | 10/2015 | Xue | H04L 41/0893 |
| | | | | 370/336 |
| 2015/0319081 | A1* | 11/2015 | Kasturi | H04L 49/355 |
| | | | | 709/239 |
| 2016/0021588 | A1* | 1/2016 | Kamdar | H04W 28/08 |
| | | | | 370/331 |
| 2016/0330748 | A1* | 11/2016 | Bindrim | H04L 63/104 |
| 2016/0337189 | A1* | 11/2016 | Liebhart | H04L 45/306 |
| 2016/0337902 | A1* | 11/2016 | Hahn | H04W 28/08 |
| 2017/0180565 | A1* | 6/2017 | Chowdhury | H04L 65/1006 |
| 2017/0208011 | A1* | 7/2017 | Bosch | H04L 47/29 |
| 2017/0289047 | A1* | 10/2017 | Szilagyi | H04L 41/0853 |
| 2017/0359758 | A1* | 12/2017 | Chigurupati | H04M 15/66 |
| 2018/0227221 | A1* | 8/2018 | Starsinic | H04L 41/0893 |
| 2018/0359662 | A1* | 12/2018 | Kim | H04L 65/1016 |
| 2018/0367323 | A1* | 12/2018 | Chen | H04M 15/66 |
| 2019/0081894 | A1* | 3/2019 | Yousaf | H04L 45/745 |
| 2019/0158997 | A1* | 5/2019 | Starsinic | H04L 12/14 |
| 2019/0246327 | A1* | 8/2019 | Tipton | H04L 12/5692 |
| 2020/0305021 | A1* | 9/2020 | Hirata | H04L 12/14 |

OTHER PUBLICATIONS

3rd Generation Partnership Project, "3rd Generation Partnership Project; Technical Specification Group Services and System Aspects; Policy and charging control architecture (Release 13)", Technical Specification, 3GPP TS 23.203 V13.7.0, Mar. 1, 2016, pp. 1-242, 3GPP, France.

3rd Generation Partnership Project, "3rd Generation Partnership Project; Technical Specification Group Core Network and Terminals; Policy and Charging Control (PCC); Reference points (Release 13)", Technical Specification, 3GPP TS 29.212 V13.5.0, Mar. 1, 2016, pp. 1-257, 3GPP, France.

3rd Generation Partnership Project, "3rd Generation Partnership Project; Technical Specification Group Core Network and Terminals; Traffic steering control; Representational state transfer (REST) over St reference point (Release 13)", Technical Specification, 3GPP TS 29.155 V13.1.0, Mar. 1, 2016, pp. 1-41, 3GPP, France.

Halpern, J. et al., "Service Function Chaining (SFC) Architecture", Internet Engineering Task Force (IETF), Request for Comments: 7665, Oct. 1, 2015, pp. 1-32, IETF.

Cisco Systems et al., "Diameter ST Protocol", CT WG3 Meeting #82bis, Oct. 12, 2015, pp. 1-6, Belgrade, Serbia, C3-154169.

Office Action issued in corresponding EP Application No. 16744680.6 dated Dec. 20, 2019, 07 Pages.

* cited by examiner

METHODS AND SERVERS FOR MANAGING TRAFFIC STEERING POLICIES

TECHNICAL FIELD

Embodiments herein relate to communication systems, such as telecommunication systems, computer systems and the like. In particular, a method and a policy server for managing traffic steering policies as well as a method and a traffic steering server for managing traffic steering policies are disclosed. Corresponding computer programs and computer program carriers are also disclosed.

BACKGROUND

In telecommunication systems, a function known as Policy and Charging Control (PCC) enables network operators, e.g. the—so called—Public Land Mobile Network (PLMN) operators, to dynamically control network resources with real-time policies based on service, subscriber or usage context. The policies are typically used to manage network traffic, e.g. to control network access for subscribers. The policies can also steer traffic of subscribers to service functions for Network Address Translation (NAT), antimalware, parental control and the like. Furthermore, PCC deals with charging subscribers, or users, for different services, such as voice, video and data services and the like. Therefore, the PCC offers the ability for operators to not just control subscriber entitlement and network resources, but to charge for that control with real-time policy management and charging. In this way, operators can offer innovative, convenient and flexible ways for subscribers to buy and use their services, such as on-demand services, real-time upgrades, service passes and Advice-of-Charge alerts.

In order to offer a flexible PCC, a so called Flexible Mobile Service Steering (FMSS) architecture has been proposed. The FMSS architecture, disclosed in e.g. Third Generation Partnership Project (3GPP) Technical Report (TR) 22.808, Release 14, comprises a Policy and Charging Rules Function (PCRF) that is connected to a Policy and Charging Enforcement Function (PCEF) via a Gx interface. The PCEF is commonly included in a Packet Gateway (PGW or P-GW) that splits traffic into user plane traffic and control plane traffic. The PGW receives the traffic from a Serving Gateway (SGW). The control traffic passes over e.g. the Gx interface to the PCRF from the PGW and the user plane traffic passes over e.g. a Gi interface to a (S)Gi-Local Area Network (LAN). Moreover, the PCRF is connected to a Traffic Steering Support Function (TSSF) of the (S)Gi-LAN via an St interface. The Gi-LAN includes a number of Service Functions, each of which is invoked depending on a policy to be applied for the traffic. The policy, or traffic steering policy, is locally configured in the TSSF. The policy may be used for uplink, downlink or both. For example, the TSSF may configure traffic detection and forwarding entities in the Gi-LAN to fulfill the policy.

The FMSS architecture, defined in 3GPP, allows the PCRF to provide service steering control information to the TSSF, i.e. the PCRF indicates to the TSSF what configured policy to apply when a service identified by an application identifier or service data flow is detected at the Gi-LAN.

Once the PCRF provides—to the TSSF—a policy identifier, such as a Traffic Steering (TS) policy identifier, related to the service, it is expected that the policy will be executed. As an example, if the installation/activation of the policy fails, the PCRF can decide whether to apply a different policy or terminate the service, or service data flow. Even if the PCRF would apply the different policy as soon as a message about that installation/activation of the policy has failed, the service, or service data flow, may disadvantageously be interrupted. A problem of the existing FMSS architecture is thus that the service may be interrupted when the policy has to be changed.

SUMMARY

An object may be to improve flexibility of the above mentioned FMSS architecture.

According to an aspect, the object is achieved by a method, performed by a policy server, such as a PCRF, for managing traffic steering policies for steering of traffic of a user equipment. The traffic steering policies are applicable by a traffic steering server to manage the traffic. The policy server generates a policy request. The policy request comprises the traffic steering policies. The traffic steering policies include a first traffic steering policy and a second traffic steering policy, both the first and second traffic steering policies being applicable to the traffic in one direction with respect to the user equipment. Then, the policy server sends the policy request to the traffic steering server.

According to another aspect, the object is achieved by a policy server configured for managing traffic steering policies for steering of traffic of a user equipment. The traffic steering policies are applicable by a traffic steering server to manage the traffic. The policy server is configured for generating a policy request. The policy request comprises the traffic steering policies. The traffic steering policies include a first traffic steering policy and a second traffic steering policy, both the first and second traffic steering policies being applicable to the traffic in one direction with respect to the user equipment. Moreover, the policy server is configured for sending the policy request to the traffic steering server.

According to a further aspect, the object is achieved by a method, performed by a traffic steering server, such as a TSSF, for managing traffic steering policies for steering of traffic of a user equipment. The traffic steering policies are applicable by the traffic steering server to manage the traffic. The traffic steering server receives a policy request from a policy server. The policy request comprises the traffic steering policies. The traffic steering policies include a first traffic steering policy and a second traffic steering policy, both the first and second traffic steering policies being applicable to the traffic in one direction with respect to the user equipment. The traffic steering server applies at least one of the first and second traffic steering policies to manage the traffic.

According to yet another aspect, the object is achieved by a traffic steering server configured for managing traffic steering policies for steering of traffic of a user equipment. The traffic steering policies are applicable by the traffic steering server to manage the traffic. The traffic steering server is configured for receiving a policy request from a policy server. The policy request comprises the traffic steering policies. The traffic steering policies include a first traffic steering policy and a second traffic steering policy, both the first and second traffic steering policies being applicable to the traffic in one direction with respect to the user equipment. Furthermore, the traffic steering server is configured for applying at least one of the first and second traffic steering policies to manage the traffic.

According to further aspects, the object is achieved by computer programs and computer program carriers corresponding to the aspects above.

The embodiments herein may be applied to e.g. an St interface between a PCRF and a TSSF in a FMSS architecture according to 3GPP standard specifications. In this case, the embodiments enhance information exchanged between the PCRF and the TSSF over the St interface. Moreover, the PCRF and/or the TSSF may then take further actions based on the information exchanged.

In one example of the embodiments when applied to the FMSS architecture, the PCRF indicates, to the TSSF, a secondary traffic steering policy, such as the aforementioned second traffic steering policy. The second traffic steering policy may apply when some SF involved in a service chain is degraded, such as degenerated, unavailable, interrupted, occupied, inhibited, limited or the like.

In this manner, the PCRF may provide information about an alternative service chain, e.g. as indicated by the second traffic steering policy, to be used when the first traffic steering policy degrades, is not available or is otherwise inhibited in some way. Service chain refers to a set of Service Functions (SFs) to be invoked according to a certain traffic steering policy. The PCRF indicates to the TSSF about the second traffic steering policy that may be applied when some SF in a service chain, as indicated by the first traffic steering policy, is degraded, not available or inhibited in some way.

In one other example of the embodiments when applied to the FMSS architecture, the PCRF indicates to the TSSF to apply different traffic steering policies on per service instance basis. For example, the first traffic steering policy may apply to a first instance of a service in respect to a user equipment, and the second traffic steering policy may apply to a second instance of the same service of the same user equipment.

In this manner, the PCRF may indicate to the TSSF to apply different traffic steering policies on per service instance basis.

An advantage is hence that the embodiments herein enable an operator to adjust the traffic steering policy without interruption, or at least with less interruption.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
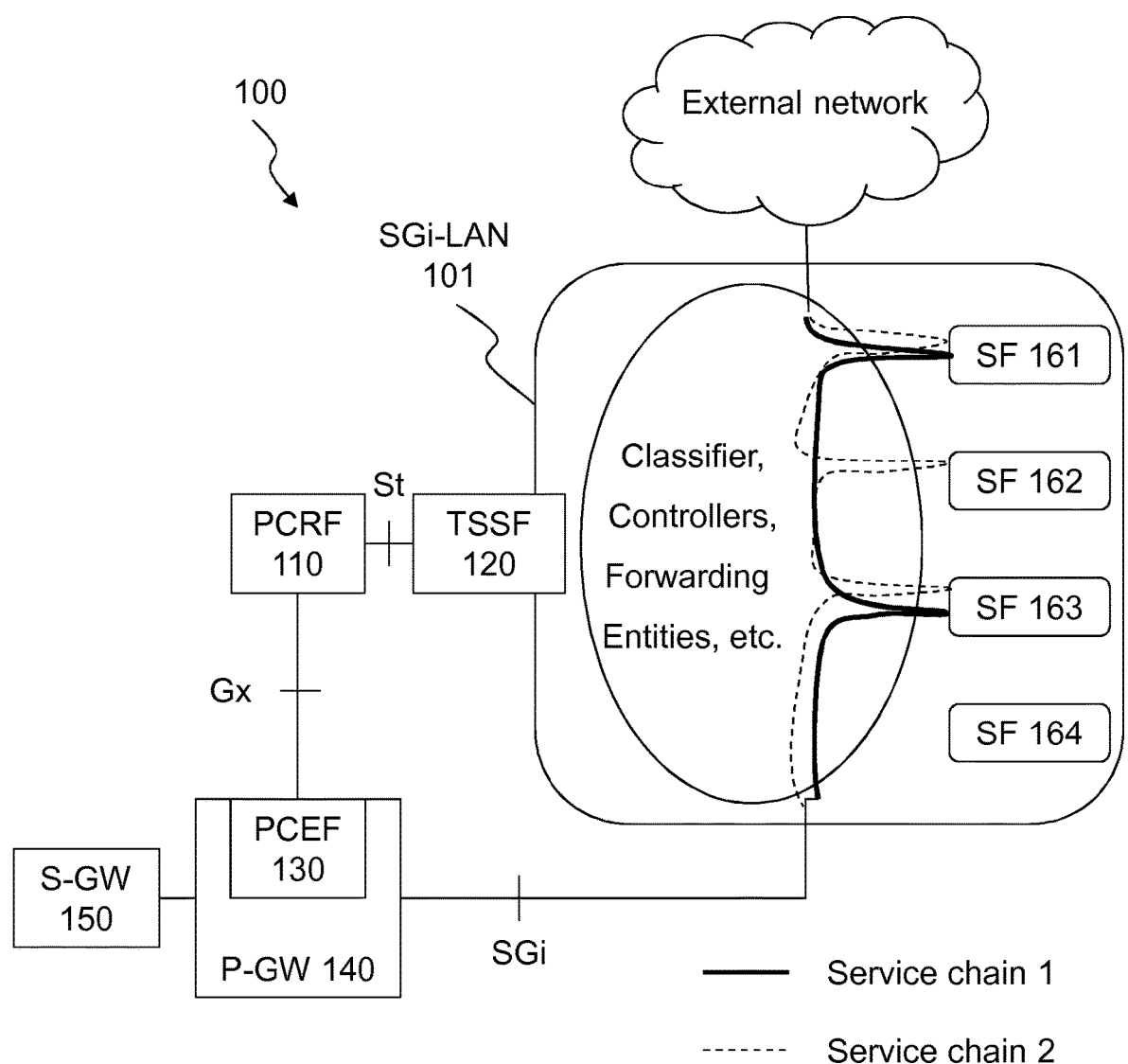
FIG. 1 is a schematic overview of an exemplifying system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying system 100 in which embodiments herein may be implemented. The system 100 includes functions as specified in FMSS architecture, specified in e.g. 3GPP TS 23.203, 29.212 and 29.213.

In the system 100, a policy server is exemplified by a server implementing a PCRF 110 and a traffic steering server is exemplified by a server implementing a TSSF 120. The PCRF 110 connects to the TSSF 120 via a St interface.

Moreover, the PCRF 110 connects to a PCEF 130 that may be comprised in, such as co-located with, a Packet Gateway (PGW) 140.

The PGW 140 receives traffic, including user traffic and control traffic, from a Serving Gateway (SGW) 150. The user traffic, or user plane traffic, may include user data, payload data, content data etc. The control traffic, or control plane traffic, may include control information relating to e.g. policies, traffic rules, traffic steering rules, charging rules, etc. A user equipment (not shown) may send or receive the traffic. The user equipment may be associated with a service flow relating to a service that may execute at least partially in the user equipment. This kind of service provided by execution at least to some extent within the user equipment may herein be referred to as application in order to better distinguish from service as used in the terms "service chain", "service function" etc.

An (S)Gi-LAN 101 connects to e.g. the P-GW 140 over SGi interface. The (S)Gi-LAN 101 provides various Internet Protocol (IP)-based services, such as Network Address Translation (NAT), antimalware, parental control, Distributed-Denial of Service (DDoS) protection, video optimization and the like. The SGi-LAN 101 is—commonly— external to a 3GPP network including e.g. the PCRF 110, the P-GW 140 and the S-GW 150.

As used herein, the term user equipment may refer to a wireless communication device, a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

An SGi-LAN may include a set of classifiers, controller, and/or forwarding entities which are configured by the TSSF 120 in order to invoke one or more service functions 161-164 depending on applied traffic steering policy. The applied traffic steering policy may provide e.g. Network Address Translation (NAT), antimalware, parental control, video optimization, DDoS, Analytics, charging instances, etc.

Now, in order to better appreciate benefits and advantages of the embodiments herein, Policy and Charging Control (PCC)—as presented in section "Background—is analyzed and some problems thereof are revealed.

It may be acknowledged that existing PCC has proven to fulfill, or at least nearly fulfill, market needs so far. The known PCC thus covers at least some use cases required by the market, such as operators, network providers and the like. However, requirements and needs as expressed by the market are changing. As will be understood from the contemplated use cases below, a more flexible PCC solution may be required in order to allow a dynamic, and possibly also relatively fast, adaptation of the network such that a service may be executed according to the requirements and needs as demanded by the market. In this context, adaptation of the network refers in particular to adaption of traffic steering policies and/or service chains and/or service functions.

With the existing PCC solution, a PCRF is only aware of when a traffic steering policy cannot be enforced. This means that the PCRF will be notified, by a TSSF, when the traffic steering policy fails to be installed, or activated. The PCRF may then request the TSSF to enforce another traffic steering policy, but the service will experience degradation, such as interruption, performance degradation or the like. Hence, there is no mechanism for dynamically, i.e. without interrupting or degrading the service delivery, applying an alternative traffic steering policy, or route.

Moreover, the PCRF may not obtain specific information about conditions, such as load on a service function, how the service function is used or the like, in the Gi-LAN.

Similarly, the TSSF is not able to dynamically adapt the traffic steering policy when service conditions changes due to changes in the service function(s) or due to changes detected by the service function(s). There is no mechanism either to inform the PLMN operator about the (S)Gi network conditions that can help to reconsider the policy information.

The embodiments herein remedy, or at least mitigate, at least some of the following deficiencies that may occur for some particular use cases.

In a first use case, when the service function is not available, e.g. a video management function is not available, the PCRF will according to existing solutions only receive information about that the enforcing of a corresponding traffic steering policy has failed. A problem with the existing solution it that there is no possibility for the PCRF provide, to the TSSF, an alternative traffic steering policy to be applied in real time in case of failure of an initially selected traffic steering policy. A failure of the initially selected traffic steering policy typically causes service disruption.

In a second use case, when more than one traffic steering policy can satisfy service demands, there is no way for the PCRF to indicate so to the TSSF with the existing solution. For example, if the PCRF wishes to offer transparent caching, using local caching as a preferred first alternative and global caching as a less preferred second alternative, it is only possible to indicate local caching with the existing solution. A problem with the existing solution is hence, similarly to the first use case, that there is no possibility for the PCRF provide, to the TSSF, an alternative traffic steering policy to be applied in real time in case more the less preferred second alternative may need to be enforced e.g. due to failure or unavailability of the first preferred alternative.

In a third use case, when more than one traffic steering policy can be involved in the service execution, there is no possibility to dynamically change the traffic steering policy. E.g. an analytics service function detects a pattern in the consumption of services in a given IP session and notifies about it, so that e.g. video managing function can be safely removed, or additional security functions can be included. Again, a problem with the existing solution is that there is no way for the PCRF to indicate to the TSSF that an alternative policy is to be enforced when certain conditions are met. The certain conditions may be that a SF detects a pattern and notifies the TSSF about the detected pattern.

Additionally, according to a fourth use case, also being related to use of two different traffic steering policies for the same direction of traffic and the same service, it may be that the PCRF wishes to dynamically change the traffic steering policy based on conditions of the service, e.g. nature of the service. As an example, Deep-Packet-Inspection (DPI) may be omitted once service negotiation has been completed. This is not possible with the existing solution.

Furthermore, with the existing solution, it is not possible to reconsider the traffic steering policies to apply based on conditions of the service, such as use of the service. As an example, when there is an abusive use of a certain service chain, e.g. due to a DoS attack or abnormal IoT device behavior, or it is not used at all, i.e. there is an abnormal IoT device behavior. During these circumstances, the existing solution would force the PCRF to cause an interruption in the service in order to apply a different traffic steering policy.

In the abovementioned use cases, interruptions of the service is required in order to adjust the traffic steering policy for various reasons as above. The interruptions cause delays, which are clearly not desirable. An object may thus be to enable quick adjustment of the traffic steering policy, preferably without interruption, where the adjustment may be cause by conditions reported by the service functions.

Briefly, a problem may be that, according to the existing solution, the decision of the content of the traffic steering policy sent from the PCRF to the TSSF, do not take into account events that may happen to one or more of the service functions that are involved in order to enforce the traffic steering policy.

Figure 2:
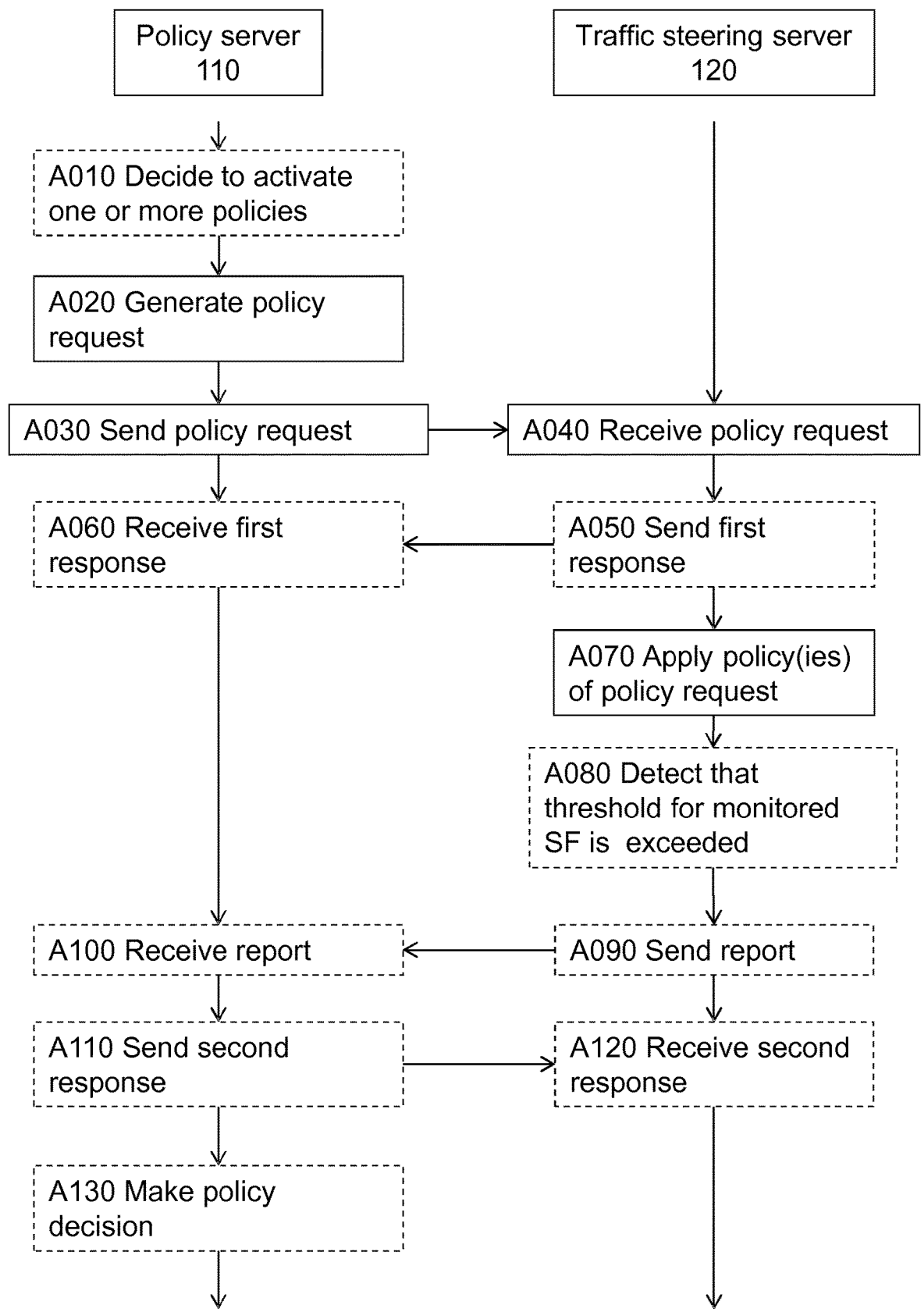
FIG. 2 is a combined signaling and flowchart illustrating the methods herein.

FIG. 2 illustrates an exemplifying method according to embodiments herein when implemented in the system 100 of FIG. 1. The policy server 110 performs a method for managing traffic steering policies for steering of traffic of a user equipment. The traffic steering server 120 performs a method for managing traffic steering policies for steering of traffic of the user equipment.

The traffic steering policies are applicable by a traffic steering server 120 to manage the traffic.

One or more of the following actions may be performed in any suitable order.

Action A010

The policy server 110 may decide to activate a traffic steering rule, such as a TS Rule, to steer traffic of the user equipment, possibly for a certain application id of an application that is running in the user equipment.

Action A020

The policy server 110 generates a policy request. The policy request comprises the traffic steering policies. The traffic steering policies include a first traffic steering policy and a second traffic steering policy, both the first and second traffic steering policies being applicable to the traffic in one direction with respect to the user equipment.

The policy request may be a Traffic Steering Request (TSR) that has been enhanced as described herein. The term TSR may be known from 3GPP standard specifications, e.g. TS 29.212, clause 5c.6.2. The policy request may e.g. include a—so called—"ADC rule", i.e. in case the interface "St" is implemented according to the "DIAMETER" protocol, a traffic steering (TS) rule or the like. The policy request may be embodied in the form of a message, an indication, a frame structure or the like.

According to some first embodiments, the second traffic steering policy may be applicable by the traffic steering server as an alternative to the first traffic steering policy due to degradation of a service function invoked. The second traffic steering policy may avoid invocation of the degraded service function and specifies a further service function instead of the degraded service function, such as degenerated service function.

In this manner, the second traffic steering policy may be used as a back-up alternative to the first traffic steering policy, when the first steering policy is degraded, fails, is interrupted or the like.

According to some second embodiments, the first traffic steering policy may be applicable by the traffic steering server to a first instance of an application of the user equipment, and wherein the second traffic steering policy is applicable by the traffic steering server to a second instance of the application of the user equipment.

In this manner, the second traffic steering policy may be used even if the first traffic steering policy has not degraded. Instead, the second traffic steering policy may be applied for e.g. the second instance of the same application for the same user equipment. This means that the first and second traffic steering policies may be applied simultaneously, but for different instances of the same application.

In some third embodiments, the policy request may comprise a service chain identifier and a service chain threshold. The service chain identifier and the service chain threshold are related to the first and/or second traffic steering policy. In this manner, the traffic steering server 120 may be made aware of which one or more service chains, aka sets of service functions invoked according to the first and/or second traffic steering policy, to monitor with respect to the service chain threshold. As a result, the policy server 110 may obtain feedback, e.g. in a report as in action A090, based on which the policy server 110 may re-adjust previously activated traffic steering policies, such as the first and/or second traffic steering policies. Alternatively, or additionally, the policy server 110 may adjust charging and quality of service parameters of the system 100 based on the feedback.

As an example, information exchanged over the St interface may be enhanced in order to allow the policy server 110 to more flexibly control the traffic steering policies. When Diameter is used, the following impacts are identified in the ADC rule, where additions as compared to the existing ADC rule definition are underlined:

```
ADC-Rule-Definition ::= < AVP Header: 1094 >
    { ADC-Rule-Name }
    [ TDF-Application-Identifier ]
    *[ Flow-Information ]
    [ Traffic-Steering-Policy-Identifier-DL ]
    [ Traffic-Steering-Policy-Identifier-UL ]
    *[ Traffic-Steering-Control-Container ]
    *[ AVP ]
```

The Traffic-Steering-Control-Container may provide the required information related to the traffic steering policy (ies)y that may enable the traffic steering server to apply one or more further traffic steering policies, such as an alternative traffic steering policy in case of the first embodiments, policies related to instances of the service function in case of the second embodiments.

The Traffic-Steering-Control-Container may be defined as:

```
Traffic-Steering-Control-Container ::= < AVP Header: 44 >
    [ TDF-Application-Instance-Identifier ]
    [ Traffic-Steering-Policy-Identifier-DL ]
    [ Traffic-Steering-Policy-Identifier-UL ]
    [ Service-Chain-Info ]
    *[ AVP ]
```

In one non-limiting example, the first traffic steering policy may be Traffic-Steering-Policy-Identifier-DL as defined directly by the ADC-Rule-Definition and the second traffic steering policy may be Traffic-Steering-Policy-Identifier-DL as defined by the Traffic-Steering-Control-Container. Accordingly, as mentioned above, both the first and second traffic steering policies are applicable to the traffic in one direction with respect to the user equipment, i.e. in this case DownLink (DL). In other cases, said one direction may be UpLink (UL).

Furthermore, in particular according to the third embodiments, the Service-Chain-Info AVP is a container of pre-configured information that both the policy server and the traffic steering server are aware of:

```
Service-Chain-Info ::= < AVP Header: yyyy >
    { Service-Chain-Info-Identifier }
    { Service-Chain-Info-Value }
    *[ AVP ]
```

The Service-Chain-Info-Identifier AVP is an identifier to certain configured information such that the traffic steering server 120 may monitor certain preconfigured events. The Service-Chain-Info-Value AVP is a label whose values are not standardized and that is associated with a Service-Chain-Info identifier. For example, Service-Chain-Info-Identifier can be "IoTdevice" and Service-Chain-Info-value can be "lowFrequencyofMessages". In this example, the service chain identifier is exemplified by Service-Chain-Info-Identifier and the service chain threshold is exemplified by Service-Chain-Info-Value. In further examples, the Service-Chain-Info-Identifier may be exemplified by "VideoOptimization" and the Service-Chain-Info-Value may be exemplified by "Exceedxpacketsperhour".

Action A030

In order to make it possible for the traffic steering server 120 to apply the first and/or second traffic steering policies, the policy server 110 sends the policy request to the traffic steering server 120.

Action A040

Subsequent to action A030, the traffic steering server 120 receives a policy request from a policy server 110.

Action A050

The traffic steering server 120 may send a first response acknowledging or non-acknowledging reception of the policy request.

Acknowledgment of the policy request may indicate that at least one of the first and second traffic steering policies was successfully applied by the traffic steering server 120. In contrast thereto, non-acknowledgment of the policy request may indicate that the traffic steering server 120 failed to apply, such as install, activate or the like, at least one of the first and second traffic steering policies.

Action A060

Subsequent to action A050, the policy server 110 may receive the first response.

Action A070

Now returning to the actions performed by the traffic steering server 120 following action A050, the traffic steering server 120 applies, such as activates, installs or the like, at least one of the first and second traffic steering policies to manage the traffic.

In some examples, when the first response is dependent on outcome of action A070, action A070 may be performed before action A050.

Action A080

According to the third embodiments, the traffic steering server 120 may detect that the service chain threshold is exceeded for the service chain identifier given by the policy request.

For example, the traffic steering server 120 may detect that load on the service chain monitored and/or the service function monitored may be over e.g. 80%.

Action A090

Subsequent to Action A080, the traffic steering server 120 may send, to the policy server 110, a report. The report comprises the first or second traffic steering policy, the service chain identifier, and the service chain threshold.

As instructed by the policy server 110, the traffic steering server 120 may now, as it has been detected in action A080 that a threshold is exceeded, report to the policy server 110 about the service chain threshold and the related service chain identifier.

The report may include an enhanced ADC-Rule-Report specified as:

```
ADC-Rule-Report ::= < AVP Header: 1097 >
    *[ ADC-Rule-Name ]
    *[ ADC-Rule-Base-Name ]
    [ PCC-Rule-Status ]
    [ Rule-Failure-Code ]
    [ Traffic-Steering-Policy-Identifier-DL ]
    [ Traffic-Steering-Policy-Identifier-UL ]
    [ Service-Chain-Info ]
    *[ AVP ]
```

This implies that the report may be associated with those traffic steering policies that are present in such ADC-Rule-Report.

In particular, as mentioned above, the service chain identifier and the service chain threshold are related to the first and/or second traffic steering policy.

In other examples, though, the information provided in the service-chain-info may be related to any traffic steering policy in the ADC-Rule-Definition that included the service-chain-info when the policy request was sent in action A030.

Action A100

Subsequent to action A090, the policy server 110 may receive, from the traffic steering server 120, the report.

Action A110

The policy server 110 may send a second response, such as a TSSF Notification Answer (TNA), to acknowledge or non-acknowledge reception of the report in action A100.

Action A120

Subsequent to action A110, the traffic steering server 120 may then receive the second response. For example, in case of non-acknowledgment the traffic steering server 120 may perform action A090 again, e.g. until the report has been acknowledged by the policy server 110.

Action A130

Upon reception of the report in action A100, the policy server 110 may make a policy decision.

For example, the policy server 110 may perform action A020 again to generate new policies that are adapted based on how the service flow is being tackled by the service functions invoked due the present first and/or second traffic steering policies.

As another example, the policy server 110 may select a different service chain for some low priority users, i.e. apply a different traffic steering policy instead of a current one.

Thanks to the embodiments herein, an operator may be able to improve use of the network and increase efficiency in delivery of the service by using appropriate resources, such as determined by a traffic steering policy, and/or by adapting the traffic steering policies, and hence the invoked service functions, to conditions relating use of the service.

Summarizing the first embodiments, when the TSSF receives a Traffic-Steering-Control-Container AVP including the Traffic-Steering-Policy-Identifier-UL and/or Traffic-Steering-Policy-Identifier-DL with the alternative policy, the TSSF will start monitoring traffic according to the Traffic-Steering-Policy-Identifier-UL/DL included within the ADC-Rule-Definition AVP. If the TSSF gets information that the service function chain is unavailable or cannot be executed by some other reason, the TSSF will apply the alternative policy. The TSSF will notify the PCRF by providing the ADC-Rule-Report AVP within the TNR command, e.g.: DIAMETER protocol message called "TSSF-Notification-Request", TNR, where the TNR command includes the applicable Traffic-Steering-Policy-Identifier-UL and/or Traffic-Steering-Policy-Identifier-DL indicating that the rules are still active within the PCC-Rule-Status AVP.

Summarizing the second embodiments, when the PCRF included several instances of Traffic-Steering-Control-Container AVP related to different service instances, the TSSF shall apply a different service function chain whenever a service instance is identified.

Summarizing the third embodiments, when the PCRF requested to monitor the network conditions by providing the Service-Chain-Info AVP, the TSSF will check the pre-configured value related to the provided Service-Chain-Info and will request to start monitoring it. For example, if the Service-Chain-Info a corresponds to "monitor the access to service chain x and report when threshold x is reached", the TSSF will contact the PCRF when the threshold is reached, sending a TNR command, with the ADC-Rule-Report AVP with the Service-Chain-Info AVP including the Service-Chain-Info-Identifier AVP and the Service-Chain-Info Status including information about the reached threshold.

When the PCRF receives a TNR command including the Traffic-Steering-Control-Container AVP, the PCRF may when an alternative service function chain is reported, modify the charging and/or QoS information of the related PCC rules according to the alternative service function chain, if applicable. This information can be used when assigning the service chain information to other users in order to apply a proper load balancing in the network. Alternatively or additionally, the PCRF may when Service-Chain-Info information is reported, depending on the kind of reported information the PCRF can terminate the service (if e.g. there is a DoS attack), apply load balancing if there is a service chain that is overloaded (i.e. provide a different Traffic-Steering-Policy-Identifier-UL/DL), make general decisions related to the traffic steering policies related to other users (e.g. if a service chain is overloaded, do not assign that to other users), notify an application.

Figure 3:
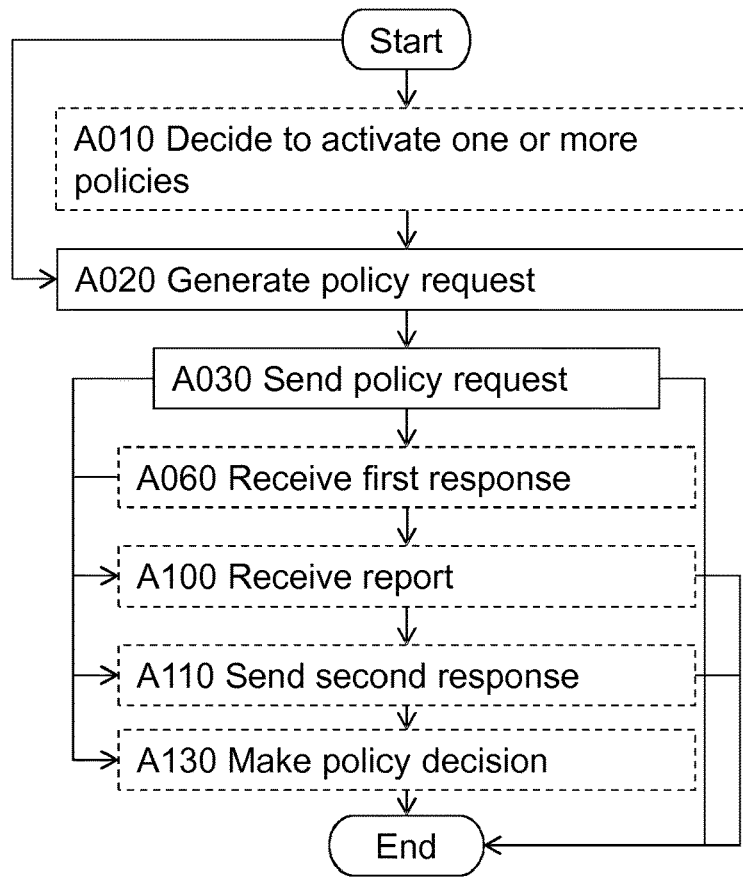
FIG. 3 is a flowchart illustrating embodiments of the method in the policy server.

In FIG. 3, a schematic flowchart of exemplifying methods in the policy server 110 is shown. Again, the same reference numerals as above have been used to denote the same or similar features, in particular the same reference numerals have been used to denote the same or similar actions. Accordingly, the policy server 110 performs a method for managing traffic steering policies for steering of traffic of a user equipment.

As mentioned, the traffic steering policies are applicable by a traffic steering server 120 to manage the traffic.

One or more of the following actions may be performed in any suitable order.

Action A010

The policy server 110 may decide to activate a traffic steering rule, such as a TS Rule, to steer traffic of the user equipment, possibly for a certain application id of an application that is running in the user equipment.

Action A020

The policy server 110 generates a policy request. The policy request comprises the traffic steering policies. The traffic steering policies include a first traffic steering policy and a second traffic steering policy, both the first and second traffic steering policies being applicable to the traffic in one direction with respect to the user equipment.

Action A030

The policy server 110 sends the policy request to the traffic steering server 120.

In some embodiments of the method, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the method, the first traffic steering policy is applicable by the traffic steering server to a first instance of an application of the user equipment, and wherein the second traffic steering policy is applicable by the traffic steering server to a second instance of the application of the user equipment.

Action A060

The policy server 110 may receive the first response, when the traffic steering server 120 has performed action A050.

Action A100

In some embodiments of the method, the policy request comprises a service chain identifier and a service chain threshold. The service chain identifier and the service chain threshold are related to the first and/or second traffic steering policy. The policy server 110 may then receive, from the traffic steering server 120, a report. The report comprises the first or second traffic steering policy, the service chain identifier, and the service chain threshold.

Action A110

The policy server 110 may send a second response, such as a TSSF Notification Answer (TNA), to acknowledge or non-acknowledge reception of the report in action A100.

Action A130

Upon reception of the report in action A100, the policy server 110 may make a policy decision.

For example, the policy server 110 may perform action A020 again to generate new policies that are adapted based on how the service flow is being tackled by the service functions invoked due the present first and/or second traffic steering policies.

As another example, the policy server 110 may select a different service chain for some low priority users, i.e. apply a different traffic steering policy instead of a current one.

Figure 4:
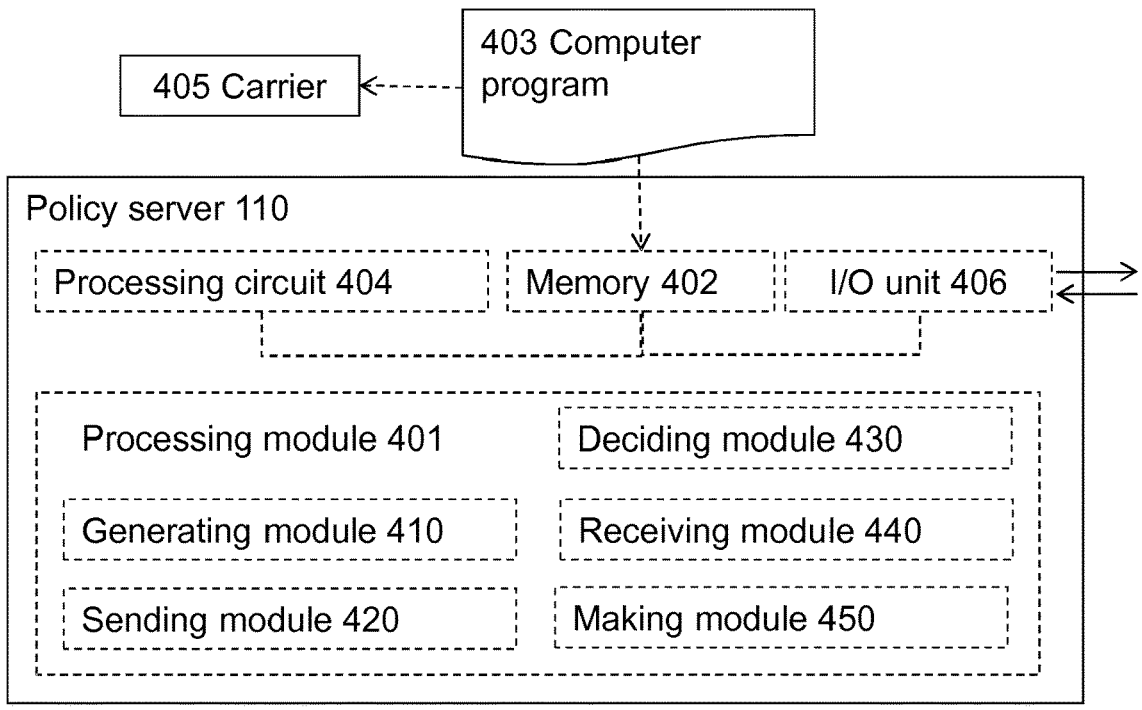
FIG. 4 is a block diagram illustrating embodiments of the policy server.

With reference to FIG. 4, a schematic block diagram of embodiments of the policy server 110 of FIG. 1 is shown.

The policy server 110 may comprise a processing module 401, such as a means for performing the methods described herein. The means may be embodied in the form of one or more hardware modules and/or one or more software modules The policy server 110 may further comprise a memory 402. The memory may comprise, such as contain or store, instructions, e.g. in the form of a computer program 403, which may comprise computer readable code units.

According to some embodiments herein, the policy server 110 and/or the processing module 401 comprises a processing circuit 404 as an exemplifying hardware module. Accordingly, the processing module 401 may be embodied in the form of, or 'realized by', the processing circuit 404. The instructions may be executable by the processing circuit 404, whereby the policy server 110 is operative to perform the methods of FIG. 2 and/or FIG. 3. As another example, the instructions, when executed by the policy server 110 and/or the processing circuit 404, may cause the policy server 110 to perform the method according to FIGS. 2 and/or 3.

FIG. 4 further illustrates a carrier 405, or program carrier, which comprises the computer program 403 as described directly above.

In some embodiments, the processing module 401 comprises an Input/Output module 406, which may be exemplified by a receiving module and/or a sending module as described below when applicable.

In further embodiments, the policy server 110 and/or the processing module 401 may comprise one or more of a generating module 410, a sending module 420, a deciding module 430, a receiving module 440 and a making module 450 as exemplifying hardware modules. In other examples, one or more of the aforementioned exemplifying hardware modules may be implemented as one or more software modules.

According to some embodiments, the policy server 110 is thus configured for managing traffic steering policies for steering of traffic of a user equipment. As mentioned, the traffic steering policies are applicable by a traffic steering server 120 to manage the traffic.

The policy server 110 is configured for generating a policy request. The policy request comprises the traffic steering policies. The traffic steering policies include a first traffic steering policy and a second traffic steering policy, both the first and second traffic steering policies being applicable to the traffic in one direction with respect to the user equipment. Moreover, the policy server 110 is configured for sending the policy request to the traffic steering server 120.

In some embodiments of the policy server 110, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the policy server 110, the first traffic steering policy is applicable by the traffic steering server to a first instance of an application of the user equipment, and wherein the second traffic steering policy is applicable by the traffic steering server to a second instance of the application of the user equipment.

In some embodiments of the policy server 110, the policy request comprises a service chain identifier and a service chain threshold. The service chain identifier and the service chain threshold are related to the first and/or second traffic steering policy. The policy server 110 may be configured for receiving, from the traffic steering server 120, a report. The report comprises the first or second traffic steering policy, the service chain identifier, and the service chain threshold.

Moreover, according to some other embodiments, the policy server 110 is configured for managing traffic steering policies for steering of traffic of a user equipment. As mentioned, the traffic steering policies are applicable by a traffic steering server 120 to manage the traffic.

The policy server 110 comprises a generating module 410 configured for generating a policy request. The policy request comprises the traffic steering policies. The traffic steering policies include a first traffic steering policy and a second traffic steering policy, both the first and second traffic steering policies being applicable to the traffic in one direction with respect to the user equipment.

Moreover, the policy server 110 comprises a sending module 420 configured for sending the policy request to the traffic steering server 120.

In some embodiments of the policy server 110, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the policy server 110, the first traffic steering policy is applicable by the traffic steering server to a first instance of an application of the user equipment, and wherein the second traffic steering policy is applicable by the traffic steering server to a second instance of the application of the user equipment.

In some embodiments of the policy server 110, the policy request comprises a service chain identifier and a service chain threshold. The service chain identifier and the service chain threshold are related to the first and/or second traffic steering policy, and wherein the policy server 110 comprises a receiving module 440 configured for receiving, from the traffic steering server 120, a report. The report comprises the first or second traffic steering policy, the service chain identifier, and the service chain threshold.

Furthermore, according to some yet further embodiments, the policy server 110 is configured for managing traffic steering policies for steering of traffic of a user equipment. As mentioned, the traffic steering policies are applicable by a traffic steering server 120 to manage the traffic.

The policy server 110 comprises a processing circuit 404 and a memory 402 containing instructions executable by the processing circuit 404, whereby the policy server 110 is operative to generate a policy request. The policy request comprises the traffic steering policies. The traffic steering policies include a first traffic steering policy and a second traffic steering policy, both the first and second traffic steering policies being applicable to the traffic in one direction with respect to the user equipment.

As mentioned, the policy server 110 comprises the processing circuit 404 and the memory 402 containing instructions executable by the processing circuit 404, whereby the policy server 110 is operative to send the policy request to the traffic steering server 120.

In some embodiments of the policy server 110, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the policy server 110, the first traffic steering policy is applicable by the traffic steering server to a first instance of an application of the user equipment, and wherein the second traffic steering policy is applicable by the traffic steering server to a second instance of the application of the user equipment.

In some embodiments of the policy server 110, the policy request comprises a service chain identifier and a service chain threshold. The service chain identifier and the service chain threshold are related to the first and/or second traffic steering policy. The instructions are executable by the processing circuit 404, whereby the policy server 110 is operative to receive, from the traffic steering server 120, a report. The report comprises the first or second traffic steering policy, the service chain identifier, and the service chain threshold.

Figure 5:
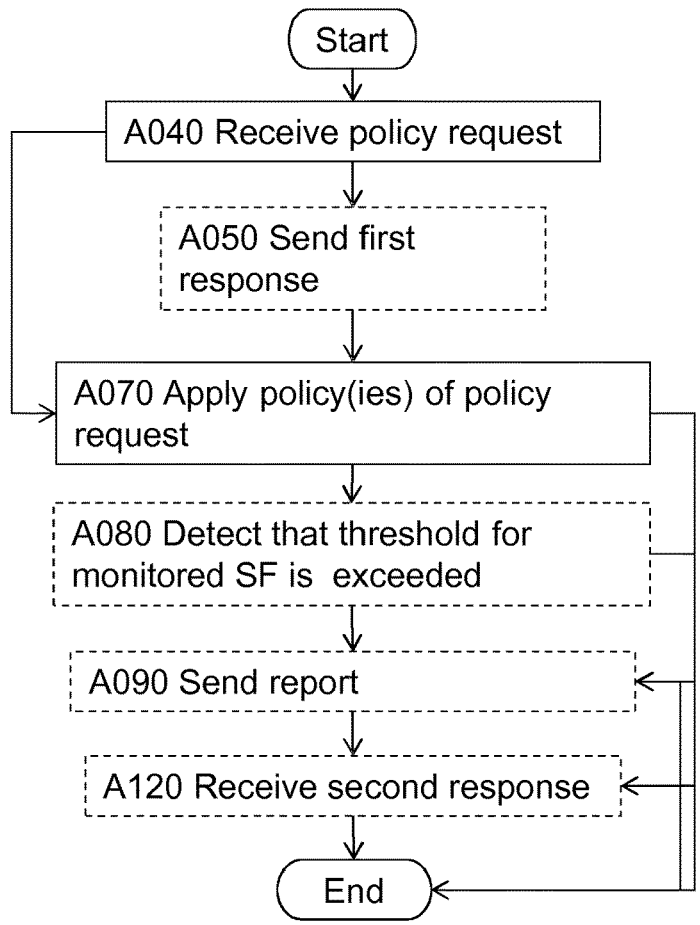
FIG. 5 is a flowchart illustrating embodiments of the method in the traffic steering server.

In FIG. 5, a schematic flowchart of exemplifying methods in the traffic steering server 120 is shown. Again, the same reference numerals as above have been used to denote the same or similar features, in particular the same reference numerals have been used to denote the same or similar actions. Accordingly, the traffic steering server 120 performs a method for managing traffic steering policies for steering of traffic of a user equipment.

As mentioned, the traffic steering policies are applicable by the traffic steering server 120 to manage the traffic.

One or more of the following actions may be performed in any suitable order.

Action A040

The traffic steering server 120 receives a policy request from a policy server 120. The policy request comprises the traffic steering policies. The traffic steering policies include a first traffic steering policy and a second traffic steering policy, both the first and second traffic steering policies being applicable to the traffic in one direction with respect to the user equipment.

Action A050

The traffic steering server 120 may send a first response acknowledging or non-acknowledging reception of the policy request.

Acknowledgment of the policy request may indicate that at least one of the first and second traffic steering policies was successfully applied by the traffic steering server 120. In contrast thereto, non-acknowledgment of the policy request may indicate that the traffic steering server 120 failed to apply, such as install, activate or the like, at least one of the first and second traffic steering policies.

Action A070

The traffic steering server 120 applies at least one of the first and second traffic steering policies to manage the traffic.

In some embodiments of the method, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the method, the first traffic steering policy is applicable by the traffic steering server to a first instance of an application of the user equipment, and wherein the second traffic steering policy is applicable by the traffic steering server to a second instance of the application of the user equipment.

Action A080

According to the third embodiments, the traffic steering server 120 may detect that the service chain threshold is exceeded for the service chain identifier given by the policy request.

For example, the traffic steering server 120 may detect that load on the service chain monitored and/or the service function monitored may be over e.g. 80%.

Action A090

In some embodiments of the method, the policy request comprises a service chain identifier and a service chain threshold. The service chain identifier and the service chain threshold are related to the first and/or second traffic steering policy. The traffic steering server 120 may send, to the policy server 110, a report. The report comprises the first or second traffic steering policy, the service chain identifier, and the service chain threshold.

Action A120

Subsequent to action A110, the traffic steering server 120 may then receive the second response. For example, in case of non-acknowledgment the traffic steering server 120 may perform action A090 again, e.g. until the report has been acknowledged by the policy server 110.

Figure 6:
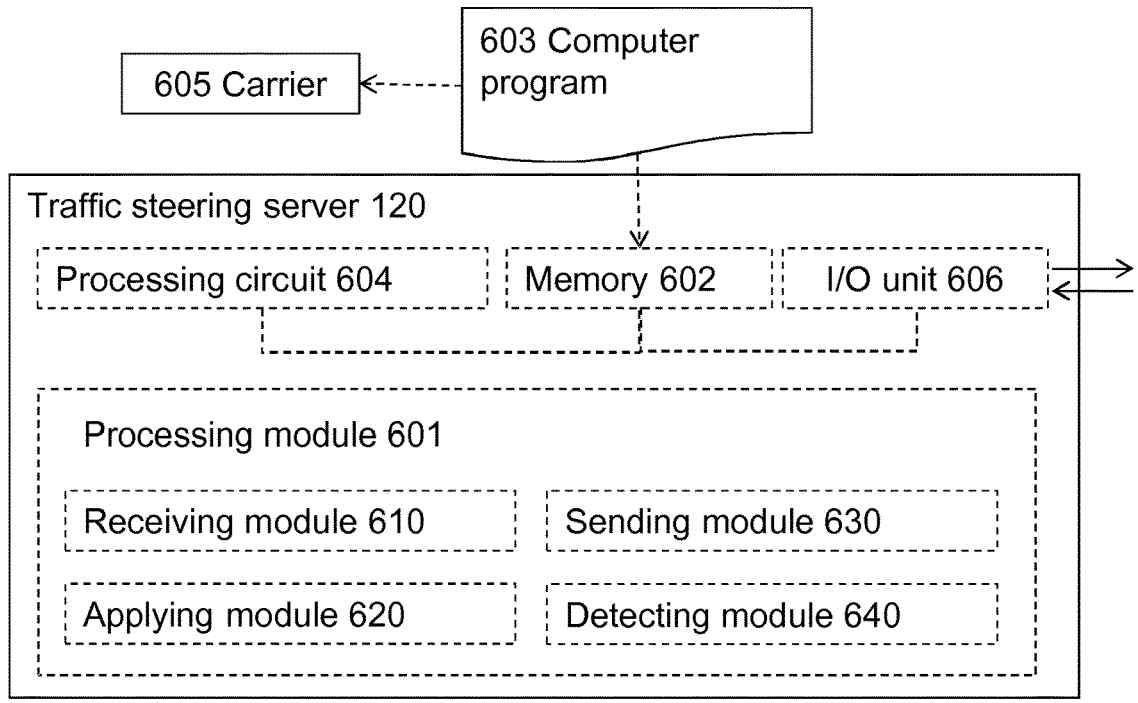
FIG. 6 is a block diagram illustrating embodiments of the traffic steering server.

With reference to FIG. 6, a schematic block diagram of embodiments of the traffic steering server 120 of FIG. 1 is shown.

The traffic steering server 120 may comprise a processing module 601, such as a means for performing the methods described herein. The means may be embodied in the form of one or more hardware modules and/or one or more software modules The traffic steering server 120 may further comprise a memory 602. The memory may comprise, such as contain or store, instructions, e.g. in the form of a computer program 603, which may comprise computer readable code units.

According to some embodiments herein, the traffic steering server 120 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the traffic steering server 120 is operative to perform the methods of FIG. 2 and/or FIG. 5. As another example, the instructions, when executed by the traffic steering server 120 and/or the processing circuit 604, may cause the traffic steering server 120 to perform the method according to FIGS. 2 and/or 5.

FIG. 6 further illustrates a carrier 605, or program carrier, which comprises the computer program 603 as described directly above.

In some embodiments, the processing module 601 comprises an Input/Output module 606, which may be exemplified by a receiving module and/or a sending module as described below when applicable.

In further embodiments, the traffic steering server 120 and/or the processing module 601 may comprise one or more of a receiving module 610, a applying module 620, a sending module 630 and a detecting module 640 as exemplifying hardware modules. In other examples, one or more of the aforementioned exemplifying hardware modules may be implemented as one or more software modules.

According to some embodiments, the traffic steering server 120 is configured for managing traffic steering policies for steering of traffic of a user equipment. As mentioned, the traffic steering policies are applicable by the traffic steering server 120 to manage the traffic.

The traffic steering server 120 is configured for receiving a policy request from a policy server 120. The policy request comprises the traffic steering policies. The traffic steering policies include a first traffic steering policy and a second traffic steering policy, both the first and second traffic steering policies being applicable to the traffic in one direction with respect to the user equipment.

Furthermore, the traffic steering server 120 is configured for applying at least one of the first and second traffic steering policies to manage the traffic.

In some embodiments of the traffic steering server 120, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the traffic steering server 120, the first traffic steering policy is applicable by the traffic steering server to a first instance of an application of the user equipment, and wherein the second traffic steering policy is applicable by the traffic steering server to a second instance of the application of the user equipment.

In some embodiments of the traffic steering server 120, the policy request comprises a service chain identifier and a service chain threshold. The service chain identifier and the service chain threshold are related to the first and/or second traffic steering policy. The traffic steering server 120 may be configured for sending, to the policy server 110, a report. The report comprises the first or second traffic steering policy, the service chain identifier, and the service chain threshold.

According to some other embodiments, the traffic steering server 120 is configured for managing traffic steering policies for steering of traffic of a user equipment. As mentioned, the traffic steering policies are applicable by the traffic steering server 120 to manage the traffic.

The traffic steering server 120 comprises a receiving module 610 configured for receiving a policy request from a policy server 120. The policy request comprises the traffic steering policies. The traffic steering policies include a first traffic steering policy and a second traffic steering policy, both the first and second traffic steering policies being applicable to the traffic in one direction with respect to the user equipment.

Moreover, the traffic steering server 120 comprises an applying module 620 configured for applying at least one of the first and second traffic steering policies to manage the traffic.

In some embodiments of the traffic steering server 120, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the traffic steering server 120, the first traffic steering policy is applicable by the traffic steering server to a first instance of an application of the user equipment, and wherein the second traffic steering policy is applicable by the traffic steering server to a second instance of the application of the user equipment.

In some embodiments of the traffic steering server 120, the policy request comprises a service chain identifier and a service chain threshold. The service chain identifier and the service chain threshold are related to the first and/or second traffic steering policy. Furthermore, the traffic steering server

120 comprises a sending module 630 configured for sending, to the policy server 110, a report. The report comprises the first or second traffic steering policy, the service chain identifier, and the service chain threshold.

According to some yet other embodiments, the traffic steering server 120 is configured for managing traffic steering policies for steering of traffic of a user equipment. As mentioned, the traffic steering policies are applicable by the traffic steering server 120 to manage the traffic.

The traffic steering server 120 comprises a processing circuit 604 and a memory 602, containing instructions executable by the processing circuit 604, whereby the traffic steering server 120 is operative to receive a policy request from a policy server 120. The policy request comprises the traffic steering policies. The traffic steering policies include a first traffic steering policy and a second traffic steering policy, both the first and second traffic steering policies being applicable to the traffic in one direction with respect to the user equipment.

Furthermore, the instruction are executable by the processing circuit 604, whereby the traffic steering server 120 is operative to apply at least one of the first and second traffic steering policies to manage the traffic.

In some embodiments of the traffic steering server 120, the second traffic steering policy is applicable by the traffic steering server as an alternative to the first traffic steering policy due to degeneration of a service function invoked. The second traffic steering policy avoids invocation of the degenerated service function and specifies a further service function instead of the degenerated service function.

In some embodiments of the traffic steering server 120, the first traffic steering policy is applicable by the traffic steering server to a first instance of an application of the user equipment, and wherein the second traffic steering policy is applicable by the traffic steering server to a second instance of the application of the user equipment.

In some embodiments of the traffic steering server 120, the policy request comprises a service chain identifier and a service chain threshold. The service chain identifier and the service chain threshold are related to the first and/or second traffic steering policy. The instructions are executable by the processing circuit 604, whereby the traffic steering server 120 is operative to send, to the policy server 110, a report. The report comprises the first or second traffic steering policy, the service chain identifier, and the service chain threshold.

In the following, some features relating to the embodiments herein are briefly described again and further information is given in order to facilitate implementation and/or to improve understanding of terms and expressions used herein.

The embodiments herein provide improvements concerning management of service chains and/or traffic steering policies. In particular, the embodiments herein provide improvements in respect of enhancement of so called traffic steering control as currently defined by 3GPP specifications, e.g. 3GPP TS 23.203, TS 29.212, and TS 29.213. These specifications define a so called "Policy and Charging Control", PCC, architecture. Moreover, the 3GPP specifications envisage that the traffic steering policies are determined by a policy server entity of the PCC architecture, i.e. the aforementioned PCRF. Additionally, the traffic steering policies are transmitted to a server entity, i.e. the aforementioned TSSF for the sake of enforcement by means of invoking a selection of service functions.

The term "Service Chain" (SC) refers herein to a set of Service Functions (SF), e.g. implemented by one or more physical and/or virtual nodes, to which an uplink and/or downlink flow/stream of data packets from/to a user equipment of a user are routed for processing in order to enforce the traffic steering policy. Additionally, a sequence in which the involved SFs should be invoked is established. The set of SFs are encompassed in the (S)Gi-LAN network, which is connected to gateways of a 3GPP telecom system via the Gi interface, or SGi interface. For example, a typical network function that may be involved in a particular SC may include nodes implementing functions such as: firewalls, Deep Packet Inspection (DPI), video optimization, Transport Control Protocol (TCP) enhancements, HyperText Transfer Protocol (HTTP) header enrichment, Network Address Translation (NAT), load balancers, caching, etc. For example, a SC policy, or traffic steering policy, may comprise 1) routing data packets to a DPI function and, then 2) route the packets to a firewall.

The term "traffic steering control", as currently defined by 3GPP specifications as mentioned above, refers to that the PCRF sends specific rules, such as traffic steering rules, ADC rules etc., for traffic steering to the TSSF in order to govern the SC of a certain service, executing in a user equipment. The specific rules provide instructions, to the TSSF, about how to set up service chaining (SC), e.g. which SF to invoke, for the application that originates and/or terminates in the user equipment. The interface between the PCRF and the TSSF is called "St", as mentioned above with reference to FIG. 1. Then, the TSSF ensures that the traffic steering policy, i.e. as indicated by the PCRF in the received rules, such as TSR, ADC or the like, is enforced. Next, the TSSF performs specific actions, as configured (or even preconfigured) for the received traffic steering policy, in respect to entities of the (S)Gi-LAN network (see FIG. 1). The specific actions include selection of which SF of the (S)Gi-LAN to activate, or invoke, for a service flow of the application in the user equipment.

Traffic Steering in (S)Gi-LAN and the PCC Architecture in 3GPP

The (S)Gi-LAN network handles services flows from a so called GTP-tunnel endpoint in the PGW up to a Point of Interface (PoI) to a different network-provider, be it a public or enterprise network. The (S)Gi-LAN is often managed by an operator. The (S)Gi-LAN network comprises service functions for providing traffic steering in a Flexible Mobile Service Steering (FMSS architecture).

In order to realize traffic steering in the operator deployed (S)Gi-LAN, the network operator uses various parameters, related to the subscriber session and the application traffic, to define traffic steering policies. These policies are used to control the steering of the subscriber's traffic to appropriate service enablers (e.g. NAT, antimalware, parental control, DDoS protection) in the (S)Gi-LAN.

The PCRF supports the generation of one or more traffic steering policies for the support of flexible service steering in the (S)Gi-LAN. This will ensure a central function controlling all subscriber related policies, aka user equipment related policies, within the 3GPP core network architecture. The 3GPP core network architecture includes the PCC, the FMSS architecture, and more.

The PCRF is the functional element that encompasses policy control decision and flow based charging control functionalities. It provides network and gating control, and manages the flow based charging. Via the Diameter Gx interface, using Policy and Charging Control (PCC) rules, the PCRF instructs the Policy and Charging Enforcement Function (PCEF) regarding the treatment of each service data flow.

Over its basic functionalities described in the last paragraph, the PCRF can provide traffic steering control information to the TSSF for the traffic detected based on application level information or service data flow level information for the purpose of steering the subscriber's selected traffic to the appropriate (S)Gi-LAN service function. Thus, the PCRF may provision, install, activate, modify and remove traffic steering policies by means of the traffic steering control information.

A traffic steering policy is locally configured in TSSF and can be used for uplink, downlink or for both directions. To ensure that the traffic steering policy is enforced, the TSSF performs deployment specific actions as configured for that traffic steering policy. For example, the TSSF may configure traffic detection and forwarding entities in the (S)Gi-LAN to fulfil the traffic steering policy. The traffic detection and forwarding entities may be configured such that the service flow passes some desired services functions as specified by a policy being applied.

The PCRF and the TSSF node are described in 3GPP TS 23.203 and the Diameter St reference point is described in the 3GPP TS 29.212 (Diameter version) and 3GPP TS 29.155 (REST version).

In order to apply traffic steering control information, TS rules are defined over the St reference point. These rules are also called ADC rules for the Diameter version of the interface. For readability purposes TS rules are used in this document. The TS rules include an application identifier or service data flow in order to identify the service to be detected plus a TS policy identifier (UL/DL), or a Traffic-Steering-Policy-Identifier, that refers to the traffic steering policy to apply when the service is detected.

Traffic Steering Control in the 3GPP Standards

TSSF control of service chaining is specified as an application on top of the SDN controller in the Open Networking Foundation—SDN Architecture Overview and in the Open Flow Switch Specification 1.3.3.

The acronym SDN stands for "Software Defined Network". In particular, the aim of a SDN is to provide open interfaces enabling development of software that can control the connectivity provided by a set of network resources and the flow of network traffic though them, along with possible inspection and modification of traffic that may be performed in the network.

The Service Function Chaining (SFC) Architecture is also being defined in IETF (see RFC7665, Service Function Chaining (SFC) Architecture). According to this RFC the following terminology is used:

Network Service: An offering provided by an operator that is delivered using one or more service functions Service Function Chain (SFC): A service function chain defines an ordered set of abstract service functions (SFs) and ordering constraints that must be applied to packets and/or frames and/or flows selected as a result of classification.

Service Function (SF): A function that is responsible for specific treatment of received packets. One or more Service Functions can be involved in the delivery of added-value services.

Service chaining using SDN creates software-controlled service chains where the subscriber traffic flows are steered in a hop-by-hop manner, passing through an ordered sequence of Service Functions (SFs) called service chains.

One example of a network service can be a long lived high speed video service. A non-exhaustive list of abstract Service Functions includes: firewalls, Wide Area Network (WAN) and application acceleration, Deep Packet Inspection (DPI), LI (Lawful Intercept), server load balancing, HTTP Header Enrichment functions, TCP optimizer. A service chain can require DPI, load balancing and HTTP header enrichment Service Function(s) simultaneously.

Service chains can be defined based on the subscriber profile, service type, traffic patterns, or other characteristics.

Dynamic Service Chaining Policies

The existing solution defined in 3GPP is based on the PCRF providing service steering control information to the TSSF, i.e. the PCRF indicates the TSSF what configured policy to apply when the service identified by the application identifier or service data flow is detected at the SGi-LAN.

Once the PCRF provides a TS policy identifier to the TSSF related to certain service, it is expected that the related policy will be executed. If the installation/activation of the TS policy fails, the PCRF can decide whether to apply a different policy or terminate the service.

However, there is no possibility to apply alternative service chains based on changes on status of the SF, e.g. SF unavailability, apply different service chains during the lifetime of the service, e.g. when different key performance indicators change for the service, or reconsider the used service chain based on the use of the service, e.g. detection of presumed abnormal device behavior. The key performance indicators may include e.g. latency values, number of times the service did not succeed, number of times the service was disconnected, etc.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, a software server, a software client, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a policy server, for managing traffic steering policies for steering of traffic of a user equipment, wherein the traffic steering policies are applicable by a traffic steering server to manage the traffic, the method comprising:
generating a policy request, wherein:
the policy request comprises the traffic steering policies,
the traffic steering policies include a first traffic steering policy and a second traffic steering policy, and
both the first and second traffic steering policies are applicable to the traffic in one direction with respect to the user equipment;
sending the policy request to the traffic steering server;
receiving a report from the traffic steering server; and
in response to receiving the report, generating new traffic steering policies that are adapted based on how a service flow associated with the traffic is being tackled by service functions invoked due to at least one of the first and second traffic steering policies.

2. The method of claim 1, wherein:
the policy request further comprises a service chain identifier and a service chain threshold,
the service chain identifier and the service chain threshold are related to the first and/or second traffic steering policy, and
the report comprises:
the first or second traffic steering policy,
the service chain identifier, and
the service chain threshold.

3. A policy server configured for managing traffic steering policies for steering of traffic of a user equipment, wherein the traffic steering policies are applicable by a traffic steering server to manage the traffic; the policy server comprising:
processing circuitry; and
memory containing instructions executable by the processing circuitry, whereby the policy server is operative to:
generate a policy request, wherein:
the policy request comprises the traffic steering policies,
the traffic steering policies include a first traffic steering policy and a second traffic steering policy, and
both the first and second traffic steering policies are applicable to the traffic in one direction with respect to the user equipment;
send the policy request to the traffic steering server;
receive a report from the traffic steering server; and
in response to the reception of the report, generate new traffic steering policies that are adapted based on how a service flow associated with the traffic is being tackled by service functions invoked due to at least one of the first and second traffic steering policies.

4. The policy server of claim 3, wherein:

the policy request further comprises a service chain identifier and a service chain threshold, the service chain identifier and the service chain threshold are related to the first and/or second traffic steering policy, and the report comprises:
  the first or second traffic steering policy,
  the service chain identifier, and
  the service chain threshold.

5. The method of claim 1, wherein:

the second traffic steering policy is applicable by the traffic steering server as an alternative to the first traffic steering policy due to degradation of a service function invoked according to the first traffic steering policy, and the second traffic steering policy avoids invocation of the degraded service function and specifies a further service function instead of the degraded service function.

6. The method of claim 1, wherein:

the first traffic steering policy is applicable by the traffic steering server to a first instance of an application of the user equipment, and the second traffic steering policy is applicable by the traffic steering server to a second instance of the application of the user equipment.

7. The policy server of claim 3, wherein:

the second traffic steering policy is applicable by the traffic steering server as an alternative to the first traffic steering policy due to degradation of a service function invoked according to the first traffic steering policy, and the second traffic steering policy avoids invocation of the degraded service function and specifies a further service function instead of the degraded service function.

8. The policy server of claim 3, wherein:

the first traffic steering policy is applicable by the traffic steering server to a first instance of an application of the user equipment, and the second traffic steering policy is applicable by the traffic steering server to a second instance of the application of the user equipment.

\* \* \* \* \*